Aug. 22, 1967 C. LEE ET AL 3,337,749

VOLTAGE-CONTROLLED SIGNALLING APPARATUS

Filed March 30, 1964

INVENTORS
CURTIS LEE
PHILIP A. ROSS

BY Rolf M. Pitts

ATTORNEY

United States Patent Office 3,337,749
Patented Aug. 22, 1967

3,337,749
VOLTAGE-CONTROLLED SIGNALLING APPARATUS

Curtis Lee, Los Angeles, and Philip A. Ross, Santa Ana, Calif., assignors to North American Aviation, Inc.

Filed Mar. 30, 1964, Ser. No. 355,666
2 Claims. (Cl. 307—88.5)

ABSTRACT OF THE DISCLOSURE

Means for providing a controlled attenuation of a first electrical signal in response to a second electrical signal; the gain of a symmetrical ladder network of shuntable series impedances interconnecting a push-pull input network and a push-pull output network is controlled by the application of a control voltage to shunt-connected diodes.

*Background of the invention*

Frequently, in the processing of electrical signals by means of transistor amplifiers, particularly in analog signalling systems, it is desirable to either gate or provide a controlled attenuation of an input signal as a function of a control voltage. Where the input signal is an A-C signal, it is desired to obtain such attenuation without unnecessary or undesirable phase shift. Also, where such A-C signal may occupy, or vary in frequency over, a wide band of frequencies, it is desirable that the attenuator response be substantially invariant with variations in the frequency of the A-C input signal-to-be-attenuated. Further, it is desired that sufficient impedance isolation be present between the input signal and the output signal such that the control signal does not feed through to the attenuator output as to adversely bias the output as well as attenuate the same.

The concept of the subject invention provides voltage-controlled means having the above features, by means of a novel symmetrical network.

In a preferred embodiment of the subject invention there is provided a push-pull impedance network having a first and second like series impedance branch, each branch having a like intermediate terminal, each of which is commonly interconnected to a control terminal by one of a pair of like-poled diodes.

In operation of the above described arrangement, a D-C control voltage is conductively applied to the diodes by means of the control terminal whereby the conductive diodes serve as shunt impedances across the series impedance branches, thereby increasing the attenuation provided by the push-pull network. The resultant increase in attenuation due to the shunt impedance effect of the shunt diode connected across the series attenuators of each branch varies as the diode impedance itself varies in response to variations in the conductively coupled control voltage.

Further, the symmetry of the network arrangement provides impedance isolation whereby the output of the attenuator is not coupled to the control voltage source. Moreover, by means of the above described symmetrical arrangement, frequency-sensitive phase-shift response is reduced, whereby the attenuator is adapted for use over a wide frequency-band of signals-to-be-attenuated. Accordingly, it is an object of the subject invention to provide improved voltage-controlled attenuation means.

It is another object of the subject invention to provide improved means for attenuating A-C signals in response to a control voltage.

It is still another object of the subject invention to provide improved signal attenuation means adapted for use over a wide band of signal frequencies.

It is a further object of the subject invention to provide a voltage-controlled attenuator employing a symmetrical attenuation network for which the attenuator output is substantially decoupled from the control voltage source.

It is still a further object of the subject invention to provide improved means for gating a signal in response to a gating voltage.

These and further objects of the invention will become apparent from the following description taken together with the accompanying drawings in which.

In the figures, like reference characters refer to like parts.

Figure 1:
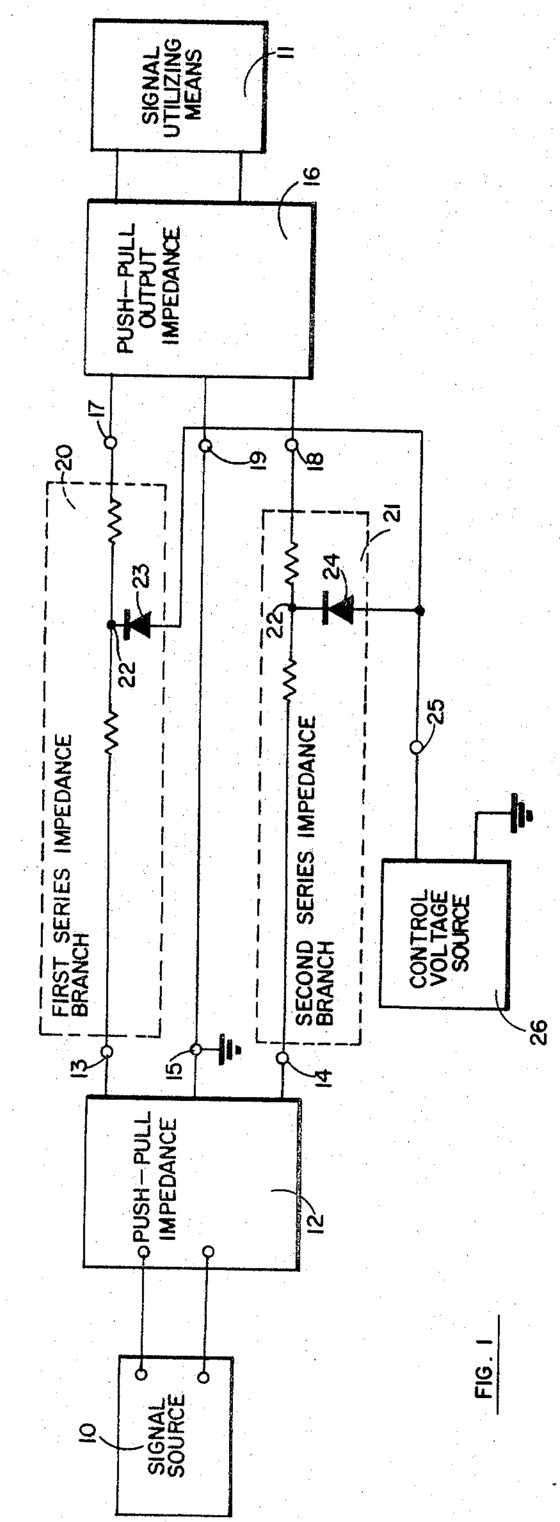
FIG. 1 is a schematic arrangement illustrating a concept of the invention.

Referring now to FIG. 1, there is illustrated a schematic arrangement of the concept of the invention. There is provided a two-terminal source 10 of a signal to be attenuated and a two-terminal signal-utilizing device 11. Interconnecting source 10 and device 11 is a symmetrical, three-terminal or push-pull impedance network comprising a push-pull input impedance 12 having a first and second output terminal 13 and 14, and an output center-tap 15; and a push-pull output impedance 16 having a first and second input terminal 17 and 18 and an input center-tap 19, the center-tap terminals 15 and 19 being interconnected, the first terminals 13 and 17 of the push-pull impedances comprising a first pair of terminals and the second terminals 14 and 18 of the push-pull impedances comprising a second pair of terminals. Push-pull input and output impedance means 12 and 16 may be comprised of commercially available inductive elements such as transformer elements manufactured, for example, as Model 94–1513 by Aladdin Electronics, Inc. of Nashville, Tenn.

The push-pull network of FIG. 1 further comprises a first and second series network branch 20 and 21, each having an intermediate control terminal 22; first series branch 20 interconnecting the first pair of terminals 13 and 17, and second series branch 21 interconnecting the second pair of terminals 14 and 18.

A pair of diodes 23 and 24, having like first electrodes interconnected to form a first control terminal 25, interconnect the intermediate electrodes 22 to the control terminal 25, a respective second electrode of diodes 23 and 24 being connected to a mutually exclusive one of terminals 22. Diodes 23 and 24 are preferably commercially available low capacitance diodes such as, for example, type IN3066 manufactured by Fairchild Semiconductor Corp., of Mountain View, Calif.

The first control terminal 25 and the commonly connected center-taps 15 and 19 are adapted for connection across a two-terminal control voltage source 26. Source 26 may be a low impedance D-C voltage source conductively applied across terminal 25 and commonly connected center taps 15 and 19, so that the polarity thereof corresponds with the polarity of the like-poled diodes 23 and 24 whereby the combined conductive impedance of source 26 and a respective one of diodes 23 and 24 is shunted across terminal 15 and a corresponding one of terminals 22. Alternatively, control voltage source may be an A-C signal source up to as high as 60 megacycles per second. A suitable half-cycle of which is conductively coupled by diodes 23 and 24 across terminals 15 and 22. Hence, the effective impedance of each of impedance branches 20 and 21 is increased, causing a correspondingly increased attenuation of the input signal (from source 10), resulting in a reduced output signal level at the input to signal utilizing means 11, the effective shunt impedance offered by each of diodes 23 and 24 being a function of the applied control voltage.

In other words, in ordinary operation of the device of FIG. 1, the diodes 23 and 24 serve as unidirectionally-conductive shunt impedances the effective impedance of which is a function of the applied control voltage and the diode conductive impedance characteristic (which varies as a function of the applied voltage). In the absence of an applied control voltage at terminal 25, the diodes appear as very large impedances, whereby the shunting effect is substantially reduced or practically eliminated.

Where the response-threshold of the signal-utilizing means 11 is above the attenuated output signal level provided by the attenuator of FIG. 1 (in response to a control voltage applied at terminal 25), then the attenuator may be employed to gate an input signal applied by signal source 10. In other words, where the attenuator means is capable of attenuating the output signal therefrom below a useable level, the attenuator may be employed as signal-gating means.

Figure 2:
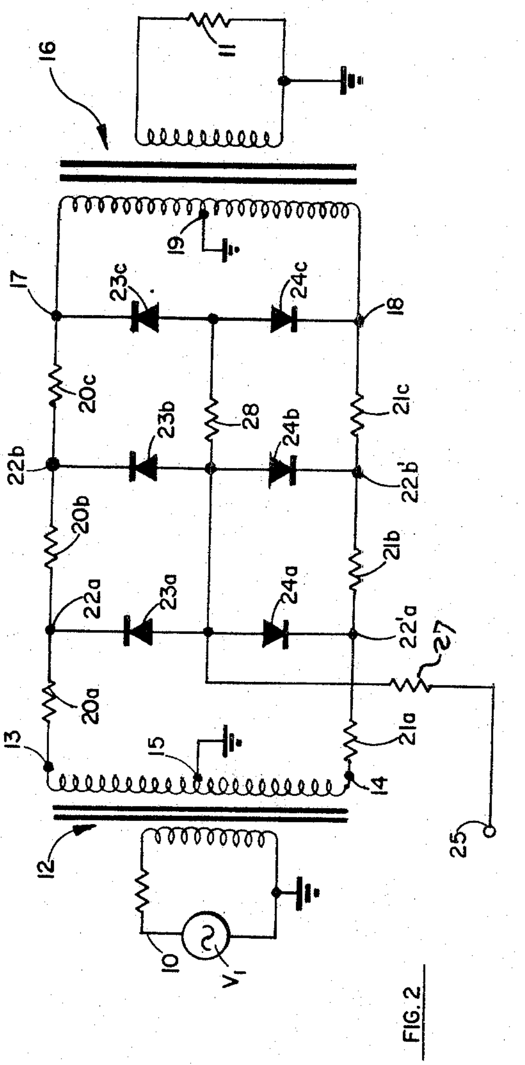
FIG. 2 is a schematic diagram of a circuit embodying the concept of the invention.

The range of attenuation obtainable from the device of FIG. 1 may be increased by adding further series impedance network elements in tandem, as shown in FIG. 2.

Referring to FIG. 2, there is illustrated a circuit diagram comprising elements 10, 11, 12, 16 and 25 constructed and arranged to cooperate substantially the same as like-referenced elements of FIG. 1. There are also provided a first plurality of series connected impedances 20*a*, 20*b*, and 20*c* interconnecting first terminals 13 and 17 of push-pull impedances 12 and 16; and a second like plurality of impedances 21*a*, 21*b* and 21*c* similarly interconnecting second terminals 14 and 18 of push-pull coupling means 12 and 16. Intermediate control terminals are provided by the successive interconnections of the series-connected pluralities of impedances, the interconnection of resistors 20*a* and 20*b* defining intermediate terminals 22*a* and the interconnection of resistors 20*b* and 20*c* defining intermediate terminal 22*b* in the first plurality of impedances. Similarly, the interconnection of resistors 21*a* and 21*b* defines intermediate terminal 22*a'* and the interconnection of resistors 21*b* and 21*c* defines intermediate terminal 22*b'*.

A corresponding plurality of series-connected pairs of oppositely-poled diodes 23 and 24 are provided, each pair being connected across a corresponding one of the successive interconnections or intermediate terminals 22. Hence, a first pair of series-connected oppositely poled diodes 23*a* and 24*a* are connected across terminals 22*a* and 22*a'*; a second like pair of oppositely poled diodes 23*b* and 24*b* are connected across terminals 22*b* and 22*b'* and a third pair of diodes 23*c* and 24*c* are connected across terminals 17 and 18, the diodes of each pair of diodes being interconnected by a like electrode thereof. The series-interconnection between the diodes of each oppositely-poled pair of diodes is commonly connected to voltage control terminal 25 by means of series control resistor 27. A further current-limiting resistor 28 is interposed between series control resistor 27 and the mutually interconnected electrodes of diodes 23*c* and 24*c* for reasons which will be more fully explained hereinafter.

In other words, a first and second diode of each pair of diodes are connected back-to-back, commonly connected first or like electrodes thereof being coupled in circuit to terminal 25, and a second electrode thereof being connected to a respective intermediate attenuation terminal of a first series impedance network 20 and second series impedance 21. Hence, a first and second like-poled diode 23*a* and 24*a* interconnect control terminal 25 to attenuation terminals 22*a* and 22*a'* respectively; a third and fourth like-poled diode 23*b* and 24*b* interconnect terminal 25 to terminals 22*b* and 22*b'* respectively, and fifth and sixth like-poled diodes 23*c* and 24*c* interconnect terminal 25 to terminals 17 and 18, resistor 27 being commonly interposed in series circuit between terminal 25 and the common interconnections of diodes 23*a*, 24*a*, 23*b*, 24*b*, 23*c* and 24*c*.

Because of the low end-terminal to center tap impedance of transformer 16 and the low conductive impedance of shunting diodes 23*c* and 24*c*, it may be deemed desirable to insert a current-limiting impedance in circuit with diodes 23*c* and 24*c*. Accordingly, resistor 28 is further interposed in series between resistor 27 and the back-to-back interconnection of diodes 23*c* and 24*c*.

By means of the increased number of attenuation terminals to be shunted in each of first series network (20*a*, 20*b* and 20*c*) and second series network (21*a*, 21*b* and 21*c*), a greater range of attenuation control may be provided over the range of voltage responsive shunt impedance obtainable from a given type of diode design. Further, because of the increased number of shunt paths provided by the tandem arrangement of FIG. 2, relative to FIG. 1, a greater degree of attenuation can be obtained, whereby the device of FIG. 2 may be effectively employed as a signal gate.

Further, because of the symmetrical or push-pull arrangement of the control circuit of FIG. 2 (as well as of FIG. 1), the D-C control currents through each half of the respective windings of the transformers 12 and 16 are mutually opposed, whereby coupling of the control voltage source (applied to control terminal 25) is avoided. Even transformer core saturation effects due to a D-C bias current are avoided due to the mutually opposed or zero net excitation currents produced by a control voltage. Hence, no output signal will be produced across either the output terminals of output transformer 16 or the input terminals of input transformer 12, in the absence of an input signal-to-be-attenuated applied across the input terminals of transformer 12. Therefore, the control voltage does not bias or affect the operating points of either an input transistor circuit or an output-utilization transistor circuit.

Further, because a voltage applied to terminal 25 produces no effect at the output of transformer 16 in the absence of an input applied to transformer 12, it is clear that the device of FIGS. 1 and 2 can employ an A-C signal of fixed amplitude applied across the input of transformer 12 to gate-on a D-C signal of a selected polarity or an A-C signal applied to terminal 25. In this way, the output from transformer 16 is a function of the *amplitude* of such variable D-C voltage and a further function of the *presence* of the fixed amplitude A-C voltage.

Accordingly, improved means has been described for attenuating an A-C signal voltage in response to a control voltage of a selected polarity, whereby the output of the device is non-responsive to the control voltage in the absence of an input voltage.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A voltage controlled attenuator having a two-terminal input and two-terminal output and adapted to be interposed between a signal-source-to-be-attenuated and signal utilizing means, comprising:
   - a first and second like plurality of impedances interconnecting said input and output terminals, respectively;
   - a corresponding plurality of series-connected pairs of oppositely poled diodes,
     - each pair connected across a like successive interconnection of said impedances of said first and second like plurality of impedances;
   - a source of control voltage; and
   - a current limiting resistor interposed in series between said source of control voltage and the series-connection between the diodes of a last pair of said pairs, the series-connection between the remaining pairs of oppositely poled diodes being coupled to said source of control voltage.

2. Signalling means for providing an output signal indicative of the coincidence of the presence of an A-C input signal and preselected polarity of a control signal, and comprising:

an input transformer having a primary winding adapted to be connected to a source of signal to be attenuated, and a secondary winding having first and second end-terminals and a third grounded center tap terminal;

an output transformer having a secondary winding adapted to be connected to signal utilizing means, and a primary winding having first and second end-terminals and a third grounded center-tap terminal;

a control terminal adapted to be connected to a bipolar source of a voltage control;

a first and second like plurality of series interconnected impedances, said first plurality interconnecting said first terminals of said input transformer secondary winding and said output transformer primary winding, and said second plurality of impedances interconnecting said second terminals of said input transformer secondary winding and said output transformer primary winding;

corresponding series interconnections of successive impedances of each of said first and second plurality of impedances comprising successive pairs of attenuation terminals;

a series-interconnected oppositely-poled pair of diodes connected across each successive pair of attenuation terminals and across said end terminals of said primary winding of said output transformer, the diodes of each said pair of diodes being interconnected by a like electrode thereof, said like interconnected electrodes of said diodes being connected to said control terminal; and a current limiting resistor interposed in series between said control terminal and the interconnected like electrodes of the diodes of a last pair of said pairs.

References Cited

UNITED STATES PATENTS

| | | | |
|---|---|---|---|
| 2,003,428 | 6/1935 | Cowan | 333—81 X |
| 2,557,888 | 6/1951 | Olson | 330—145 |

ARTHUR GAUSS, *Primary Examiner.*

J. ZAZWORSKY, *Assistant Examiner.*